(12) United States Patent
Laurandel et al.

(10) Patent No.: US 6,609,917 B1
(45) Date of Patent: Aug. 26, 2003

(54) SYSTEM FOR CONNECTING AN ELECTRIC MOTOR ACTIVATING A MOTOR VEHICLE FUNCTIONAL ELEMENT

(75) Inventors: Hervé Laurandel, Caen (FR); Jean-Charles Vial, Thury-Harcourt (FR)

(73) Assignee: ArvinMeritor Light Vehicle Systems-France, Sully sur Loire (FR)

( * ) Notice: Subject to any disclaimer, the term of this patent is extended or adjusted under 35 U.S.C. 154(b) by 0 days.

(21) Appl. No.: 09/529,074

(22) PCT Filed: Oct. 1, 1998

(86) PCT No.: PCT/FR98/02106

§ 371 (c)(1), (2), (4) Date: Jun. 12, 2000

(87) PCT Pub. No.: WO99/17961

PCT Pub. Date: Apr. 15, 1999

(30) Foreign Application Priority Data

Oct. 8, 1997 (FR) .............................................. 97 12557

(51) Int. Cl.[7] .............................................. H01R 13/44
(52) U.S. Cl. ...................................... 439/135; 439/371
(58) Field of Search ......................... 439/34, 139, 357, 439/358, 148, 271; 174/72 A, 70 R; 361/826

(56) References Cited

U.S. PATENT DOCUMENTS

| 4,915,643 | A | * | 4/1990 | Samejima et al. | .......... 439/357 |
| 5,234,356 | A | * | 8/1993 | Maejima et al. | ............ 439/352 |
| 5,338,211 | A | * | 8/1994 | Kodama et al. | ............. 439/135 |
| 5,393,242 | A | * | 2/1995 | VanDerStuyf | ................ 439/364 |
| 5,556,284 | A | * | 9/1996 | Itou et al. | ...................... 439/34 |
| 5,975,933 | A | * | 11/1999 | Yamaguchi et al. | ........ 439/247 |
| 6,186,818 | B1 | * | 2/2001 | Hung | .......................... 439/357 |
| 6,217,365 | B1 | * | 4/2001 | Shinozaki | ................... 439/358 |

* cited by examiner

*Primary Examiner*—Renee Luebke
*Assistant Examiner*—Edwin A. León
(74) *Attorney, Agent, or Firm*—Carlson, Gaskey & Olds

(57) ABSTRACT

The invention concerns a system for connecting a motor to a group of conductors in the remaining pail of the vehicle, wherein the group [(2)] and the motor [(10)] includes matching connecting means [(3,4)], characterized in that the group carries a connector [(3)] adapted to be directly engaged in a matching connection well [(4)] of the motor [(1)], the connector [(3)] and the well [(4)] comprising polarizing means when the connector is engaged in said well, sealing means [(7)] between said connector and said well and means for locking/unlocking the connector in position in the well, and the engine [(1)] well [(4)] is associated with means [(5)] temporally closing the latter before the connector is mounted.

26 Claims, 1 Drawing Sheet

SYSTEM FOR CONNECTING AN ELECTRIC MOTOR ACTIVATING A MOTOR VEHICLE FUNCTIONAL ELEMENT

BACKGROUND OF THE INVENTION

The present invention relates to a system for connecting an electric motor for activating a functional component of a motor vehicle to a wiring harness for the rest of this vehicle.

The various electrical components of a motor vehicle are generally connected to a collection of electrical wires also known as a wiring harness, which runs throughout this vehicle.

This harness comprises a number of wires which connect these various electrical components to components for controlling them and therefore to the electrical power supply of the vehicle.

This is, for example, the case with the electric motors used to activate functional components of the vehicle. These electric motors are designed to drive the movement of moving parts of this vehicle, such as the windows thereof, for example.

To this end, a motor of this kind is built into a window lifter mechanism and is connected to the harness by complementing connecting means.

In the state of the art, it has been proposed, for various reasons, that the corresponding wires of the harness be fitted with connecting means designed to be engaged in a complementing connector, itself engaged in a corresponding receiving socket in the motor.

The complementing connector engaged in the socket of the motor allows the motor to be sealed to a certain extent before it is mounted in the vehicle.

It will, however, be appreciated that this structure has a certain number of drawbacks because it requires the use of an intermediate connector between the connector belonging to the harness and the connecting socket belonging to the motor.

SUMMARY OF THE INVENTION

The object of the invention is therefore to solve these problems.

To this end, the subject of the invention is a system for connecting an electric motor for activating a functional component of a motor vehicle to a wiring harness belonging to the rest of this vehicle, in which system the harness and the motor comprise complementing connecting means, characterized in that the harness carries a connector designed to be engaged directly in a complementing connecting socket belonging to the motor, the connector and the socket comprising complementing means for preventing error when engaging the connector in this socket, complementing means providing sealing between this connector and this socket and means for locking/unlocking the connector in position in the socket and in that the socket of the motor is associated with means for temporarily blocking this socket off before the harness connector is fitted in this socket.

BRIEF DESCRIPTION OF THE DRAWINGS

The invention will be better understood from the description which will follow which is given merely by way of example and made with reference to the appended drawings, in which.

DETAILED DESCRIPTION OF THE PREFERRED EMBODIMENT

Figure 1:
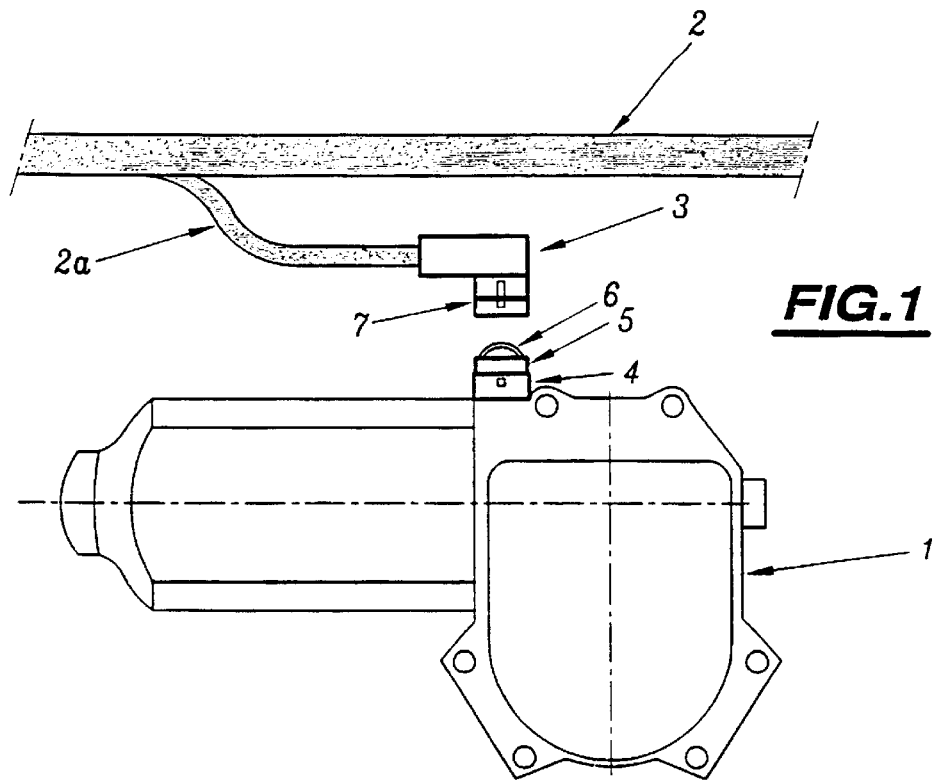
FIG. 1 depicts a functional diagram illustrating a connecting system according to the invention.
Figure 2:
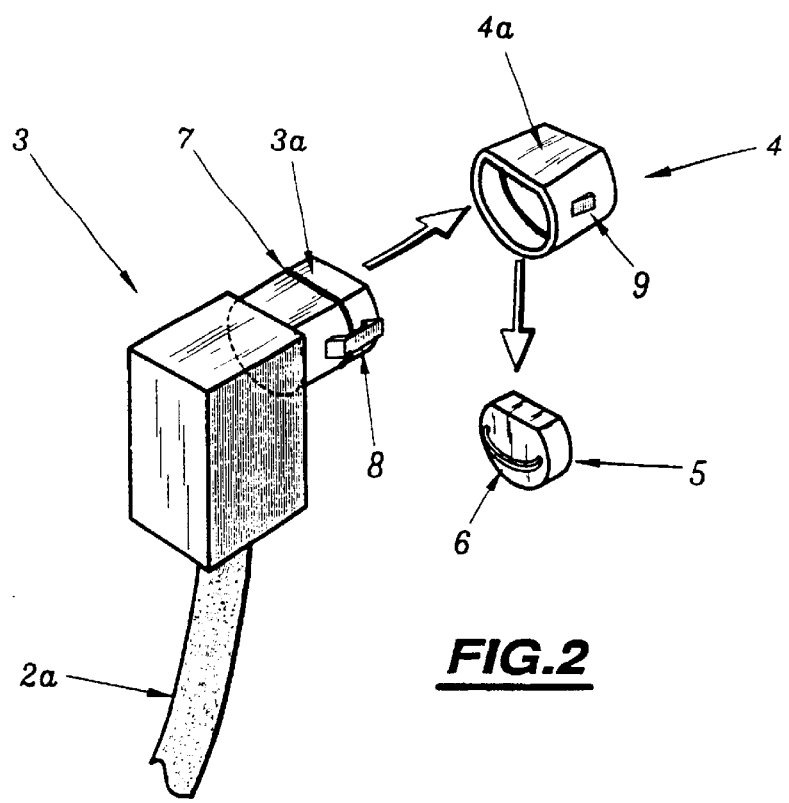
FIG. 2 depicts one embodiment of complementing connecting means used to connect a harness and a motor in a connecting system according to the invention.

As can be seen from these FIGS. 1 and 2, the connecting system according to the invention allows an electric motor for activating a functional component of a motor vehicle, and denoted by the general reference 1 in this FIG. 1, to be connected to a wiring harness for the rest of this vehicle and denoted by the general reference 2.

This wiring harness may have a conventional structure and extend through the rest of the vehicle.

One branch 2a of this harness is designed to be connected to the motor 1 and at its end comprises a connector denoted by the general reference 3.

In the conventional way, the branch 2a of the harness and the connector 3 are connected in a sealed manner.

According to the invention, this connector is designed to be engaged directly in a complementing connecting socket 4 belonging to the motor 1, this connector 3 and this socket 4 comprising, as will be described in greater detail hereafter, complementing means for preventing error when engaging the connector into the socket, complementing means for providing sealing between this connector and this socket, and means for locking/unlocking the connector in position in the socket.

In addition, the socket 4 belonging to the motor is associated with means for temporarily blocking this socket off before the connector belonging to the wiring harness is mounted in this socket.

In the embodiment depicted in these FIGS. 1 and 2, these blocking-off means are in the form of a plug denoted by the general reference 5 in these figures and which is mounted in the position for blocking off the socket 4 of the motor when this motor is delivered, for example, to an equipment manufacturer.

These blocking-off means may have any appropriate form, be made, for example, of plastic or some other material and be fitted, for example, with handling means 6 consisting, for example, of a manipulating handle or tab that allow an assembly operator to remove this plug in order to allow the connector 3 of the harness to be engaged in the socket 4 of the motor.

In the example described in these figures, these blocking-off means are therefore means that can be retracted by an operator. These means can then be used again or recycled.

It of course goes without saying that other embodiments of these means may be envisaged and that these means may, for example, comprise blocking-off means which are broken when the connector is engaged.

Once these means have been removed from their obstructing position, the operator can then engage the connector 3 of the harness in the socket 4 of the motor to connect this motor to the rest of the harness.

For this purpose, this connector 3 and the socket 4 may comprise complementing means for preventing error in this engagement.

These means may, for example, be made of portions of complementing shape 3a and 4a belonging to this connector and to this socket, so as to allow the connector 3 to be engaged in the socket 4 in only one predetermined angular position.

In the example described, these error-preventing means 3a and 4a consist of complementing flat portions belonging to these elements.

Furthermore, complementing means for providing sealing between the connector and the socket are also provided.

In the example described, these complementing means comprise a O-ring denoted by the general reference 7 in these figures and borne, for example, by the connector 3 or housed in the socket 4 and designed to provide sealing between this connector and this socket when the connector is engaged in the socket so as to avoid any problems of the malfunctioning of this motor associated, for example, with splashes of water.

Finally, the connector and the socket comprise complementing means for locking/unlocking the connector in position in the socket, for example moulded integrally with these elements.

These means comprise, for example, hooks on the connector, such as the hook denoted by the general reference 8 in FIG. 2, designed to collaborate with complementing stop surfaces, for example 9, of the socket, so as to allow the connector to be locked in position in the socket.

Of course, the hooks are, for example, elastically deformable so that they can be retracted so as to allow the connector to be unlocked from the socket and therefore allow the connector belonging to the harness to be disconnected from this socket.

It of course goes without saying that other embodiments of these various means may be envisaged and that the hooks may equally be associated with the socket.

Of course, the electrical connection pins belonging to the socket of the motor and belonging to the connector of the harness may have any known appropriate shape whatsoever.

It will therefore be appreciated that the connecting system according to the invention displays a certain number of advantages over the systems of the state of the art in so far as it makes it possible to dispense with any intermediate piece, that is to say, for example, intermediate connector which, in the state of the art, was borne by motor and designed to take the connector of the wiring harness.

In the connecting system according to the invention, once the means for temporarily blocking off the socket belonging to the motor have been removed from their obstructing position, the connector belonging to the harness is engaged directly in the socket belonging to the motor.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A system for connecting an electric motor for activating a functional component of a motor vehicle to a wiring harness belonging to said vehicle in which the harness bears a connector designed to be engaged directly in a complementing connecting socket belonging to the motor, the system further including a seal for providing sealing between said connector and said socket and a locking mechanism for locking and unlocking the connector in the socket, wherein said locking mechanism includes an elastically deformable hook on said connector which engages a complementing stop on an exterior surface of said socket, and wherein the socket of the motor is fixed to said motor and associated with a plugging mechanism for temporarily blocking said socket before the harness connector is fitted in said socket.

2. The system according to claim 1, wherein the plugging mechanism is retractable.

3. The system according to claim 2, wherein the plugging mechanism includes a handling portion.

4. The system according to claim 1, wherein the plugging mechanism breaks when the connector is engaged in the socket.

5. The system according to claim 1, wherein each of the connector and the socket include complementing flat portions.

6. The system according to claim 1, wherein the seal is an O-ring borne by the connector.

7. The system according to claim 1, wherein said plugging mechanism temporarily blocks said socket at a location where said connector engages said socket.

8. The system according to claim 1, wherein said connector, said socket and said plugging mechanism have a D-shaped cross-section.

9. The system according to claim 1, wherein said connector has a connector cross section including a connector flat surface and a connector circular surface and said socket has a socket cross section including a socket flat surface and a socket circular surface, and said connector flat surface of said connector engages said socket flat-surface of said socket to ensure proper engagement of said connector in said socket.

10. The system according to claim 1, wherein said system further includes said electric motor which includes said socket and said system further includes said functional component, and said electric motor activates said functional component.

11. The system according to claim 1, wherein said plugging mechanism includes a tab.

12. The system according to claim 11, wherein said tab is c-shaped.

13. The system according to claim 1, wherein said plugging mechanism is plastic.

14. A vehicle comprising a system for connecting an electric motor for activating a functional component of said motor vehicle to a wiring harness belonging to said vehicle in which the harness bears a connector designed to be engaged directly in a complementing connecting socket belonging to the motor, the system further including a seal for providing sealing between said connector and said socket and a locking mechanism for locking and unlocking the connector in the socket, wherein said locking mechanism includes an elastically deformable hook on said connector which engages a complementing stop on an exterior surface of said socket, and wherein the socket of the motor is fixed to said motor and associated with a plugging mechanism for temporarily blocking said socket before the harness connector is fitted in said socket.

15. The vehicle according to claim 14, wherein the plugging mechanism is retractable.

16. The vehicle according to claim 15, wherein the plugging mechanism includes a handling portion.

17. The vehicle according to claim 14, wherein the plugging mechanism breaks when the connector is engaged in the socket.

18. The vehicle according to claim 14, wherein each of the connector and the socket include complementing flat portions.

19. The vehicle according to claim 14, wherein the seal is an O-ring borne by the connector.

20. The vehicle according to claim 14, wherein said plugging mechanism temporarily blocks said socket at a location where said connector engages said socket.

21. The vehicle according to claim 14, wherein said connector, said socket and said plugging mechanism have a D-shaped cross-section.

22. The vehicle according to claim 14, wherein said connector has a connector cross section including a connector flat surface and a connector circular surface and said socket has a socket cross section including a socket flat surface and a socket circular surface, and said connector flat surface of said connector engages said socket flat surface of said socket to ensure proper engagement of said connector in said socket.

23. The vehicle according to claim 14, wherein said system further includes said electric motor which includes said socket and said system further includes said functional component, and said electric motor activates said functional component.

24. The vehicle according to claim 14, wherein said plugging mechanism includes a tab.

25. The vehicle according to clam 24, wherein said tab is c-shaped.

26. The vehicle according to claim 14, wherein said plugging mechanism is plastic.

\* \* \* \* \*